Figure 2:
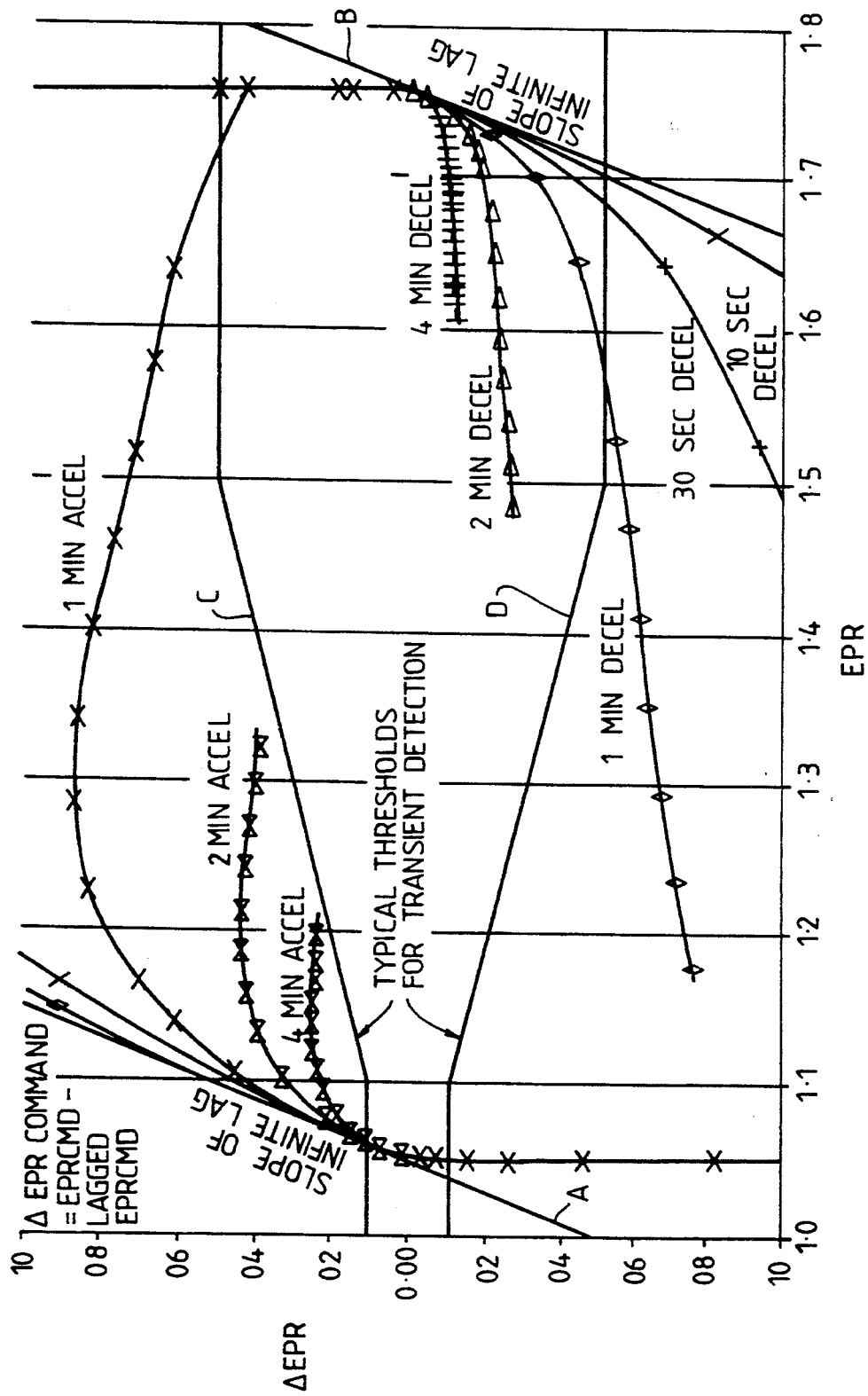

United States Patent [19]
Rowe

[11] Patent Number: 5,385,012
[45] Date of Patent: Jan. 31, 1995

[54] BLEED VALVE CONTROL

[75] Inventor: Arthur L. Rowe, Derby, England

[73] Assignee: Rolls-Royce, plc, London, England

[21] Appl. No.: 155,640

[22] Filed: Nov. 22, 1993

[30] Foreign Application Priority Data

Dec. 12, 1992 [GB] United Kingdom ............... 9225977

[51] Int. Cl.6 .................................................. F02C 9/18
[52] U.S. Cl. .................................. 60/39.02; 60/39.29
[58] Field of Search .................. 60/39.02, 39.27, 39.29; 415/26, 27, 28

[56] References Cited

U.S. PATENT DOCUMENTS 4,298,310 11/1981 Blotenberg .
4,655,034 4/1987 Kenison et al. .

FOREIGN PATENT DOCUMENTS 1377951 12/1974 United Kingdom .
1504045 3/1978 United Kingdom .
2005870 4/1979 United Kingdom .

Primary Examiner—Louis J. Casaregola
Attorney, Agent, or Firm—Cushman, Darby & Cushman

[57] ABSTRACT

A method and means are provided for operating a bleed to counter surge in the compressor of a gas turbine. A number of engine condition parameters which are precursors to a change of engine running conditions are monitored to detect changes outside predetermined limits. The method includes deriving a measure of heat soakage effects as an engine condition parameter by monitoring a gas flow value such as compressor outlet pressure, and deriving a further engine condition parameter by evaluating changes of engine power-setting by comparing instantaneous power-setting commands with lagged values of power-setting commands. If over-limit values of a monitored engine condition parameter are detected the bleed is opened and the bleed is maintained open if monitored changes of an engine operational parameter (such as compressor speed) exceed predetermined limits within a predetermined period of the opening of the bleed by an over-limit engine condition parameter.

10 Claims, 2 Drawing Sheets

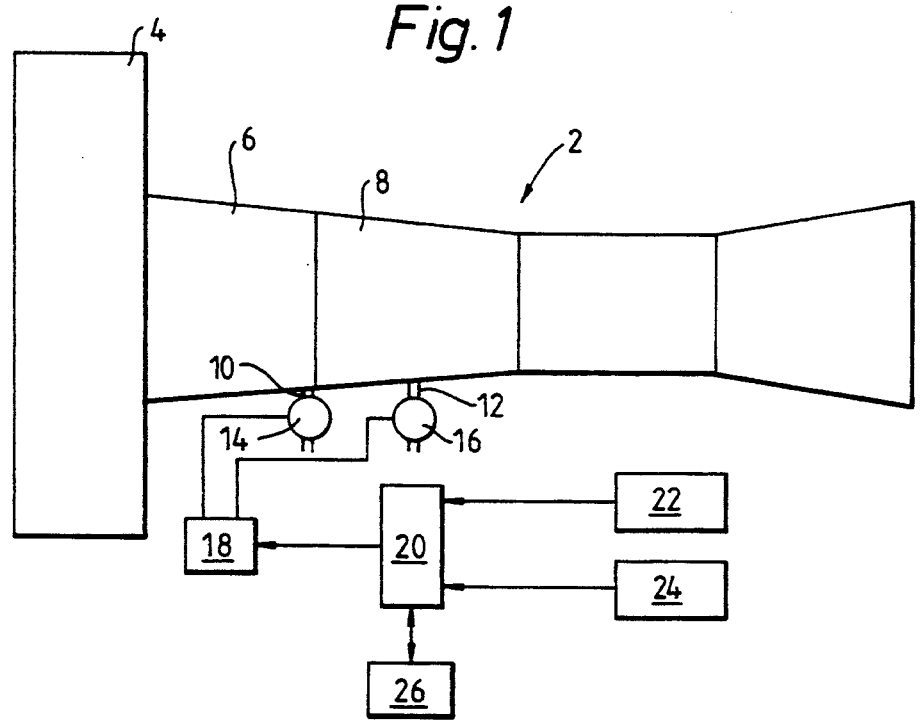
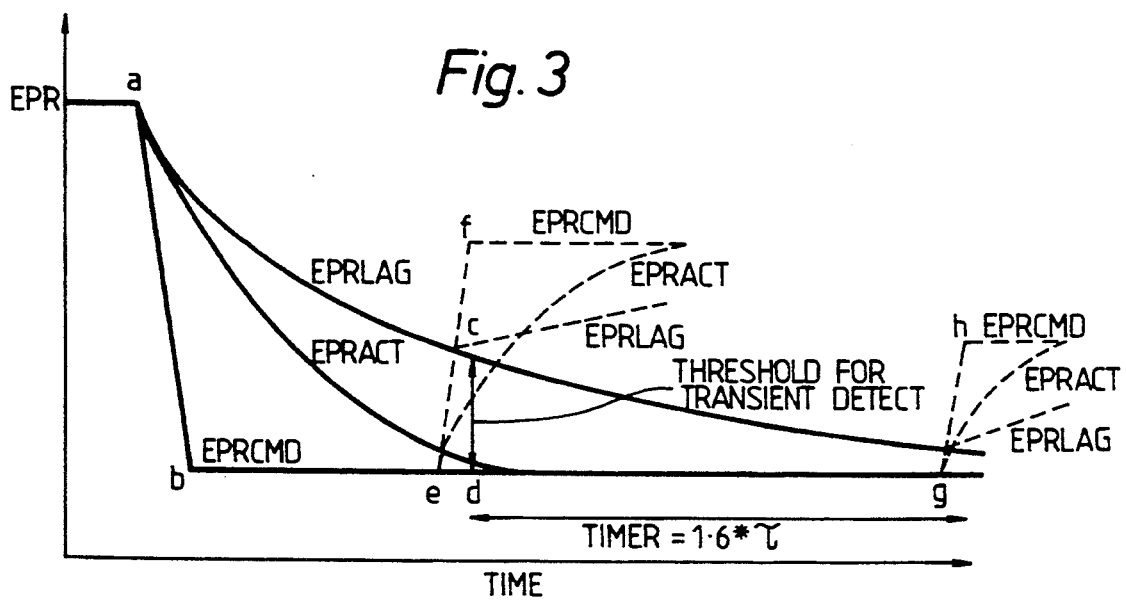

BLEED VALVE CONTROL

This invention relates to a method of and a means for controlling the onset of surge in gas turbine compressors, in particular in the compressors of aircraft jet engines.

It is known to enhance the surge margin of a jet engine compressor by providing valves which can be opened to bleed a flow from a high pressure region of the compressor to a lower pressure region, in particular a bypass duct, to stabilize the compressor. As an indication of the need for this measure the rate of change of compressor outlet pressure may be monitored and when the rate of change becomes excessive a surge flag appears to open the bleed valves. It has also been the practice to allow such bleed valves to remain open over a range of engine conditions, in particular when the engine is running at part speed or is idling, in order to enhance the stability of the compressor system, although the compressor then operates less efficiently. This is done in the interest of safety, even though there may be little risk of surge while the engine is running at a steady state under such conditions.

There has been an increasing demand in the high bypass turbo-fan engines that are now employed in commercial aircraft to minimise fuel burn during all phases of flight and for this purpose it would be desirable to maintain the compressor bleed valves closed during steady running at part speed and idle. From the point of view of safety, however, that can only be permitted if it is possible to detect and react sufficiently reliably and quickly to transient manoeuvres or other significant changes from the steady state that threaten the surge margin.

To take the case of a typical commercial turbo-fan jet engine, although the low pressure (LP) stage is normally immune from such effects, even routine changes of conditions can give rise to surge in either the intermediate pressure (IP) or the high pressure (HP) stages which can spread rapidly to the other stages. It is known, for example to monitor such parameters as changes in the engine power requirement or the compressor speed and outlet pressure or change of a bleed from the compressor to trigger the opening of the compressor bleed valve, so that high pressure air is removed while critical values of these parameters continue to be recorded.

The known surge detection systems have many shortcomings, one important weakness being the difficulty of reacting appropriately to changes of temperature in the compressor resulting from throttle movements.

To explain this problem further, it will be understood that at different steady running conditions different temperature profiles will prevail in the compressor system. With a change in the running state there will be a lagging change of the temperature profile of the gas flow relative to the engine masses because of heat soakage (which term is employed herein to include both heating and cooling effects between metal and gas). Because of the high thermal mass of such components as the compressor blades and casing it can take a significant time to establish the new temperature profile. Compressor instability can then result from the axial matching changes with temperature because the IP and HP compressor working lines are raised, and in addition the HP compressor surge line possibly may be lowered.

For example, it is known that with deceleration to a low power, heat soakage affects the HP stage internal matching, particularly at low absolute values of air flow when the temperature rises due to heat transfer from compressor blades and casing is greatest. The raising of the IP working line can be aggravated by heat soakage in the HP turbine which reduces the pressure ratio in that turbine stage and hence reduces the HP compressor stage speed and flow. Although it is possible to sense the rate of deceleration to trip compressor bleed valves, such sensing cannot be relied on below a certain minimum rate of change because of the ambiguities that can arise from signal noise and stability criteria. Attempts to reduce bleed quantities in the search for higher efficiency can lead to the risk that decelerations below the set minimum rate will put the compressor into the surge threshold.

In general, therefore heat soakage can cause problems during and following decelerations to a lower airflow rate, when the fixed thermal mass of the compressor has a proportionally greater effect for a longer period of time. Furthermore, while heat soakage effects may be greatest with large throttle closing movements from a relatively high setting, they can also arise in a lower throttle range, for example when decelerating from an approach idle speed to a minimum idle.

Heat soakage effects represent a relatively complex interaction between a considerable number of parameters including the thermal characteristics of the gas and the engine materials (metals) and the heat transfer characteristics of the gas flow, this last being influenced in turn by such factors as mass flow rate and geometry. Within the range of operating conditions in which monitoring is needed, however, it has been found that a practical solution is achievable.

In accordance with one aspect of the present invention, a method is provided for controlling the compressor bleed valve in which one or more properties of the gas flow through the compressor as an engine condition parameter is or are monitored to obtain a measure of heat soakage effects produced in the compressor by adjustment of relative temperatures between the gas flow and the compressor parts during deceleration of the engine, and the detection of values of said parameter outside a predetermined limit causing said bleed valve to open.

It is found surprisingly that it is possible to obtain a useful measure of heat soakage effects by reference to a single parameter, in particular the compressor outlet pressure or temperature, although it is also possible to use combinations of gas parameters if desired.

Sudden throttle movements are obviously another important source of disturbance leading to surge conditions. A slam acceleration will produce a rise in the HP compressor working line and so can initiate surge from the HP stage of the compressor system. Analogously, if a throttle movement is made which decelerates the compressor, because the HP spool is lighter than the IP spool it loses speed more rapidly. Consequently, the IP working line can then shift towards surge conditions. At lower initial power settings in particular the response to a change of setting is slower and the engine acceleration or deceleration schedule can frequently be attained. The significance of such effects at low throttle settings, as when changing from low idle to approach idle, is the reason for maintaining the bleed valve open when running at lower throttle settings.

For the general case, it is more appropriate to refer to changes of engine power-setting rather than changes of throttle setting since references to throttle setting might be thought not to include the operation of engines provided with autothrust systems.

According to another aspect of the invention, a method is provided for controlling the compressor bleed valve to counter compressor surge in which changes of engine power setting are monitored by comparing instantaneous values of said setting with a lagged value thereof.

Such an arrangement is able to recognise and respond to changes of engine power setting which follow in a relatively rapid sequence. If only instantaneous changes of power setting are being recorded, and a change has given rise to a surge flag, a sudden reversal of the change might cancel the flag whereas comparison with a lagged power setting value can avoid that false response.

The evaluation of the engine power settings in this procedure may rely on signals of any of a number of different parameters, such as the engine pressure ratio (EPR), or the low pressure compressor speed (particularly in bypass gas turbines), or the high pressure spool speed, as examples.

The period of lag for the lagged value is preferably made dependent, at least approximately, on the engine time constant. It should be a function of the capacity for transient response in the engine, which will vary inversely with the power level. It is possible to adopt the HP delivery pressure as an adequately proportional indicator of engine power level.

The invention will be further described by way of example with reference to the accompanying drawings, in which:

FIG. 1 is a block diagram of a gas turbine control arrangement for sensing the approach to compressor surge arising from changes of throttle setting, FIG. 2 is a graph illustrating changes of engine power command (EPR) against EPR, and FIG. 3 is a graph showing the possible interaction of sequential changes in the engine power requirement.

FIG. 1 indicates a high bypass gas turbine engine 2 with LP, IP and HP stages 4,6,8 and the numerical values given below in describing the control of surge are primarily related to such an engine. A first bleed line 10 taps into the exit region of the IP stage 6 and a second bleed line 12 taps into an intermediate region of the HP stage 8. Respective control valves 14,16 in the bleed lines are operated by control means 18 in accordance with signals issued from a gate 20 which receives inputs from first and second analyser circuits 22,24 responsive to selected engine condition parameters and operational parameters of the engine 2. The first analyser 22 has inputs for evaluating a series of engine operating conditions which could precede a change of operational state able to initiate surge when the engine is accelerating or decelerating, while the second analyser 24 monitors an acceleration or deceleration of the engine both preceding and following such changes of operating conditions in order to determine when the surge margin has been reduced too far.

The provision of the two bleed lines 10,12 from the HP and IP stages follows known practice in which the opening of the HP bleed line 12 is initiated only if the engine revolutions fall below a transient trip speed. If that condition exists when the control means 18 first operates both valves 14,16 open simultaneously, but otherwise the valve 16 will open only if and when the speed falls below the transient limit during a deceleration manoeuvre. In the following description for the sake of simplicity the staggered opening of the control valves will not be referred to further.

The actuation of the bleed valves 14,16 through the control means 18 requires initially that the analyser 22 detects one or more of its specifically assigned transients with predetermined minimum values. If, while the bleed valves are held open by such an actuating input, the second analyser detects one or more of its specifically assigned transients with predetermined minimum values, it is able to hold the bleed valves open while such a transient exists, although the actuating transient from the first analyser may fall away.

The first analyser 22 comprises means for generating an actuating output from the detection of over-limit values of engine operating condition parameters including (i) changes of engine pressure ratio command (EPR), (ii) the rotation of the HP stage at a rate that is a predetermined margin below some minimum limit— e.g. a margin of 0.5% below the idle reference speed of the engine, (iii) the existence of a pressure at HP outlet that is a predetermined margin below a minimum operating value—e.g. a margin of 1.0 psi below the minimum reference value for the compressor, (iv) the existence of conditions for a significant heat soakage effect in the compressor and, (v) the setting of the conventional surge flag, i.e. the sensing of a rate of decrease of compressor outlet pressure below a predetermined minimum value.

As described, when over-limit values of appropriate ones of these engine operating condition parameters are detected the second analyser 24, which monitors the rate of change of the shaft speed of the HP stage 8, is itself able to produce an actuating output to maintain open the bleed valve already opened in response to the first analyser output. The actuating output from the second analyser is obtained in response to a detected rate of change of said shaft speed at more than a specified rate for the acceleration or deceleration schedule of the engine—e.g. if it exceeds 0.3 times more than said schedule—or at more than a certain time rate—e.g. more than 0.5% per second.

When the engine is accelerating, conditions (i), (ii) and (iii) are relevant and if over-limit values of these parameters are detected the bleed valve is opened. As will be explained in more detail below, the bleed valve will be held open for a delay period which is extended if, during its continuance, there is a further actuating output from either of the analysers or if the original actuating output is maintained. Since the engine is in the acceleration mode, an actuating output from the second analyser is obtained only if the shaft speed is increasing at a greater rate than the specified time rate or the rate for the acceleration schedule of the engine.

When the engine is decelerating, conditions (i), (iv) and (v) detected by the first analyser 22 are able to open the bleed valve if their values are sufficient to produce an actuating output from the analyser. Similarly in this case, the bleed valve will be held open for a delay period which is extended if during its continuance there is a maintained or a further actuating output from either of the analysers. Since the engine is in the deceleration mode, the second analyser 24 output is triggered only by a rate of decrease of said shaft speed at more than the specified time rate or rate for the engine deceleration schedule.

Changes of EPR, as a measure of change of engine power setting can be significant as a transient in both acceleration and deceleration modes because they anticipate changes in the pressure ratio of the compressor throughput. A slam acceleration following a sudden increase of throttle setting, for example, will result in a rise in the HP working line. Even relatively moderate acceleration movements (e.g. a 30 second opening of the throttle) in the lower power range of the engine can initiate surge conditions in the HP stage. Conversely, a rapid deceleration has a greater effect on the surge margin if the mid to high power setting is initially operative because a faster run down of the lighter HP spool tends to throttle the IP spool and so produce a surge condition there.

In accordance with a further aspect of the invention, the changes of engine power setting are recorded by comparing the current setting with a lagged setting—in the present example comparing the current EPR value with a lagged value of EPR. The period of lag will be dependent on a time constant of the engine which is representative of the speed with which the engine is able to respond to a transient condition. The engine response rate may be affected in a complex way by control systems which apply acceleration or deceleration schedules but an exact value is not necessary. In fact, that speed of response is largely dependent upon the HP delivery pressure so that a sufficiently accurate assessment of the change in the time constant of the engine can be based solely on changes in the delivery pressure, i.e. the time constant increasing in proportion to the reduction of delivery pressure.

The time constant value chosen can only be an approximate to the time constant of the engine because when the acceleration or deceleration schedule is in control the engine response is different from when there is a first order lag arising from medium or large range transients. Even a very broad approximate of perhaps ±25% can allow useful results to be obtained, however. FIG. 2 illustrates some examples of the lagged change of EPR plotted against EPR. Between opposite limiting slopes of infinite lag A,B, there are a series of typical plots of change of EPR against EPR are given for a series of full range transients running for periods from 10 seconds to 4 minutes, each with the same engine time constant and at the same altitude and Mach number. Springing from the line of infinite lag A at the left of the chart there are shown accelerations from idle. From the right-hand side of the chart decelerations from full throttle opening spring from the line of infinite lag B.

FIG. 2 illustrates that starting from low engine speeds at which the response of the engine to an EPR command is itself relatively sluggish, even relatively slow accelerations can generate an active transient response from the first analyser 22. Decelerations from high power settings are much less sensitive and much larger threshold values are set, as is indicated by the positive and negative threshold lines C,D in FIG. 2, between which there is no response to a transient. The interval of lag of these time-lagged commands are thus approximately inversely proportional to the compressor outlet pressure.

Typically the time lag used for the lagged change of EPR will be of the order of a few seconds, e.g. not substantially more than 10 seconds, for example ranging from about 1 second at sea level with take-off throttle to 10 seconds at altitude with engine idle in one example. The values obtained for change of EPR are compared with a threshold value which will vary in dependence upon $N3 \sqrt{\theta 24}$ where $N3$ is the HP stage shaft speed and $\theta 24$ is the temperature at the inlet to the IP stage. These values appear as the upper and lower limits C,D in FIG. 2, between which there is a central band representing the region in which the lagged change of EPR is deemed not sufficient to be a surge factor.

Simultaneously with the monitoring of an increasing lagged change of EPR as the engine accelerates, the rate of change of the HP compressor shaft speed is recorded by the second analyser 24. If it rises above a predetermined value during the period in which an anticipatory signal has opened the bleed valve, its occurrence maintains the bleed valve open. In effect, the rate of change of compressor speed is being related to a slam acceleration initiated by a change of throttle setting to determine whether a threat of surge in the HP compressor remains after the sensed change of EPR falls below the threshold. The monitoring of changes of EPR to obtain anticipatory signals of the risk of surge conditions during deceleration manoeuvres and the consequent slowing of the HP compressor shaft are similarly monitored.

Anticipatory signals from the sensing of minimum shaft speed and outlet pressure in the first analyser 22 are also required, for example, to monitor accelerations at low-throttle settings, as in the case of transition from low to high (approach) idle.

The system described is also arranged to anticipate a risk of surge resulting if an increase of bleed supply from the compressor, for example if an anti-icing bleed is selected. The change of demand for high pressure air changes the minimum HP delivery pressure and can produce an acceleration of the compressor, analogously to the transition to approach idle referred to in the preceding paragraph.

As will be understood from some of the preceding comments, heat soakage effects are a potential problem in relation to deceleration transients in particular. Axial matching changes occur between the IP and HP spools, and the HP surge line can be lowered. These effects can be experienced even at relatively slow decelerations. Low flow rates also increase the effects of heat soakage because the rate of heat transfer to the gas flow is correspondingly reduced and the mass of the metal parts has the greatest effect for the longest period.

To consider further the effect of heat soakage during deceleration, an adjustment takes place over a period of time by the transfer of heat from the thermal mass of the metal parts (a given mass for any particular engine) at HP compressor delivery conditions to a cooler air flow until a new equilibrium is established. In the system being described, the increase in the HP air delivery temperature as the adjustment begins to take effect is compared with a threshold that is a function of the engine power level. If greater than that threshold, the system indicates the threat of surge and the bleed valve is opened.

The thermal mass and the heat transfer rate can be quantified for any particular model of engine. The compressor thermal mass may be equated to the mass which will release the amount of energy that is released by the engine compressor blades and casing during a deceleration between full power and idle. The transfer rate will be affected by characteristic parameters of each particular model of engine such as the surface area available for heat transfer and the heat transfer coefficient, this last being dependent on gas pressure.

It will be understood that heat soakage is essentially a lagging effect. It can be expressed in terms of a thermal time constant which varies inversely with the HP delivery pressure. In practice it is necessary to determine an empirical reference value for the time constant. The actual value is dependent upon the thermal mass of the engine but it will also vary with flight conditions, in particular the gas mass flow, on which the gas:metal thermal transfer coefficients will depend. Despite this variability it will generally be possible to choose an acceptable mean value within the range of conditions in which heat lag requires to be monitored. Using the time constant and the compressor thermal mass, if the compressor air flow conditions are known it is possible in principle to calculate the rise of gas temperature resulting from the thermal lag and so, in dependence upon the engine running conditions, identify the risk of surge.

Even if it assumed that the actual time constant is known, the equations which define heat soakage rates remain complex and involve a considerable number of variables. Surprisingly, however it has been found that an adequate approximation can be achieved based solely on measurements of a single parameter such as the HP outlet pressure (P30) for the particular model of engine.

The thermal time constant ($\tau$) can be expressed as:

$$\tau = \frac{(Tg - Tm)}{\dot{T}m} \quad (1)$$

where
Tm is metal temperature,
Tg is gas temperature.

The temperature rise in the gas due to heat soakage is related to the rate of change of metal temperature by the ratio of thermal masses of the metal and gas flow:

$$\frac{\Delta Tg}{\dot{T}m} = -\frac{(WCp)\text{metal}}{(WCp)\text{gas}} \quad (2)$$

where
$\Delta$Tg is the temperature rise in the gas due to heat soakage,
(WCp)metal is the thermal mass of the metal,
(WCp)gas is the thermal capacity of the gas.

A thermal balance for the metal gives:

$$(WCp)\text{metal} \cdot \dot{T}m = hA(Tg-Tm) \quad (3)$$

where
h is the heat transfer coefficient,
A is the metal surface area.

The thermal time constant in (1) can therefore be written $$\tau = \frac{(WCp)\text{metal}}{hA} \quad (4)$$

The only variable on the right hand side is h, the heat transfer coefficient. This can be calculated from a correlation of Nusselt number (Nu) and Reynolds number (Re):

$$Nu \alpha Re^{0.8}$$

or $$\frac{hd}{k} \alpha \left[\frac{Vd}{\mu}\right]^{0.8} \quad (5)$$

where
d is a representative linear dimension of the system,
k is the thermal conductivity of the fluid,
$\rho$ is the density of the fluid,
$\mu$ is the viscosity of the fluid.

The Reynolds number can be expressed in terms of pressure, temperature, and Mach number of the gas if the viscosity of the fluid is expressed in relation to temperature ($\mu \alpha t^{0.75}$), thus:

$$Re \alpha \frac{p \cdot M \cdot d}{t^{1.25}} \quad (6)$$

where
p is the local static pressure,
M is Mach number,
t is the local static temperature.

At HP compressor delivery, Mach number is approximately constant, and in a given compressor d is constant, leading to:

$$Re \alpha \frac{p}{t^{1.25}} \quad (7)$$

In a gas turbine compression system, pressure and temperature are related by a polytropic exponent:

$$\frac{P2}{P1} = \left[\frac{T2}{T1}\right]^n \quad (8)$$

This allows Reynolds number to be expressed in terms of pressure only. If n is assumed to be 3.0, corresponding to a polytropic efficiency of 86%, a reasonable average over the speed range;

$$Re \alpha \frac{P}{t^{1.25}} = \frac{P}{P^{\frac{1.25}{3}}} = P^{0.583} \quad (9)$$

Substituting into equation (5)

$$\frac{hd}{k} \alpha P^{0.466} \quad (10)$$

Over the temperature range 400–800K, the thermal conductivity k $\alpha$ $t^{0.776}$, and from equation (8) this gives:

$$k \alpha P^{\frac{0.776}{3}} = P^{0.259} \quad (11)$$

Substituting into (10) leaves:

$$h \alpha P^{0.466-0.259} = P^{0.725} \quad (12)$$

The variation of the heat transfer coefficient in the HP compressor is thus expressed in terms of pressure. The same variation would be expected in the IP compressor, except that a greater range of Mach numbers will be encountered here.

Referring to the equation (4), the time constant $\tau$ can now be expressed in terms of pressure:

$$\tau \alpha \frac{1}{p^{0.725}} \text{ or } \tau = \tau ref \left[\frac{Pref}{P}\right]^{0.725} \quad (13)$$

where

Pref is a reference pressure, say 14.696 psia,
$\tau$ref is the time constant at this reference pressure.

Tm can now be calculated in terms of pressure from equation (1) and in the thermal balance for the gas as given in equation (2). The only remaining unknown is the gas mass flow. At high pressure stage delivery the Mach number and hence flow function are approximately constant:

$$\frac{W\sqrt{T}}{P} = \text{constant} \quad W \alpha \frac{P}{\sqrt{T}} \quad (14)$$

Substituting the temperature from equation (7) gives $$W \alpha \frac{P}{P^{1/6}} = P^{5/6} \quad (15)$$

or $$W = Wref \cdot \left[\frac{P}{Pref}\right]^{0.333} \quad (16)$$

where

Wref is the mass flow at a reference condition.
Combining equations (1) and (13) gives:

$$\dot{T}m = \frac{(Tg - Tm)}{\tau ref} \left[\frac{P}{Pref}\right]^{0.725} \quad (17)$$

where

Tg can be calculated from $$Tg = Tref \left[\frac{P}{Pref}\right]^{0.333} \quad (18)$$

For initialising, Tref can be taken as 288.15 Kelvin and Pref as 14.696 psi but a suitable value for the time reference constant is determined experimentally and then only approximately because of the simplifying assumptions made. It is found nevertheless that these equations give a sufficiently accurate expression of the heat soakage effect in terms of a single readily obtainable variable, namely P30.

The measure of temperature change $\Delta Tg$ is compared with a threshold value which is a measure of the engine power level. In particular that threshold value is determined by the difference between the sensed gas temperature and the anticipated gas temperature under adiabatic conditions. A measured temperature change above the threshold value is flagged as a precursor of surge for the initiation of a bleed flow. A suitable threshold value may be about 4° C. but a margin, e.g. of 2° C., may be added for hysteresis. Thus a transient output is triggered from the first analyser when the heat soakage exceeds 5° C. and a fall to 3° C. is detected as a steady running state. The threshold level is preferably a function of engine power level, in particular:

$$\Delta T_{threshold} = f(NH/\sqrt{\theta 20})$$

in which NH is the inlet HP shaft speed, and
$\theta 20$ is the engine inlet temperature.

The choice of P30 as the controlling variable for the determination of incipient surge conditions resulting from heat soakage is to some extent a matter of convenience. It is possible to base the monitoring of heat soakage on another variable related to the mass gas flow, for example the outlet gas temperature T30 or the compressor gas mass flow itself, but existing engine control systems maintain a measurement of P30 and the data input is therefore already available. If more than one relevant parameter is measured, it is of course possible to base the monitoring of heat soakage effects on a plurality of such parameters.

The outputs through the gate 18 to the bleed valve control means 14,16 in response to the phenomena described are controlled by a timing clock 26 which is arranged to count out over a predetermined but adjustable period to close the gate 18. The count is started by the detection of specific transient values in the outputs of either of the first or second analysers. The arrival of a transient of the required magnitude at the gate 18 sets the timer 26 to zero and the timer is held at zero as long as that or another specific transient has been flagged by either analyser. In the absence of such transients from both analysers the timer will count out over the predetermined period and the gate 18 will be closed only after the count has been completed. This has the effect that the triggering signals do not have to be present simultaneously in the outputs from both analysers 22,24 to actuate bleed valve opening but it is necessary that they follow each other within the predetermined time period.

Such an arrangement is able to avoid a false response in certain conditions, e.g. when engine throttle control has been reversed soon after the first analyser 18 has detected a change of EPR command sufficient for it to produce an actuating output; to give an example, the engine has decelerated more quickly than the lagged EPR command and the throttle is opened again. The sequence is illustrated in FIG. 3 which shows a plot of EPR against time. A sudden throttle closure gives the sharp drop ab of EPR command shown in a first section of the curve for that function. The actual EPR therefore falls (EPRACT), at a slower rate than the command but faster than the lagged EPR values (EPRLAG) that are employed to give the change of EPR which is to be monitored. The effect is such that the monitored change of EPR exceeds the threshold value, indicated by the arrowed height cd, so that an engine operating condition is detected which will trigger bleed valve opening if the shaft speed deceleration threshold is also exceeded.

If the throttle is opened again, for example when reaching the margin of the threshold value, as is shown at A, EPR command, actual EPR and lagged EPR command follow the broken line paths shown. The EPR command line ef shows a throttle opening substantially twice as large as the threshold value but because the difference has changed sign, the instantaneous change of EPR value is below the threshold value, which is clearly unsatisfactory.

The solution is to retain the passing of a threshold value as a potential actuating signal and to discard it only after a delay period. The length of the delay period is related to the time constant of the engine. If the period is $1.6\tau_{ref}$, it can be ensured that the threshold value is held as an actuating output until the difference between EPR command current and lagged is down to 20% of the threshold value, since $$e^{-1.6} = 0.202$$

In the example, this ensures that the potential triggering signal initiated by virtue of the change of EPR being greater than the threshold value immediately before the throttle change ef, remains available an actuating input for the bleed valve control. It also ensures that any further reversal of the throttle of more than 1.2 times the threshold value, as occurs at gh in FIG. 3, will reset the timer for a further delay period.

It is a feature of many of the monitoring functions described above that relatively slow reiteration rates are acceptable for most of the data processing. Acceleration manoeuvres are an exception because they can trigger surge quite rapidly, and the critical changes of EPR command must bring a quick response. EPR and changes of EPR may therefore suitably be monitored at a 50 ms reiteration rate, but the other monitoring processes can run significantly slower. In particular heat soakage effects will require a margin of at least several seconds to become significant so a reiteration rate of as slow as about 200 ms may be acceptable.

I claim:

1. A method of controlling a compressor bleed valve in a gas turbine engine for a flow of gas from a high pressure region of the compressor to counter compressor surge, said method comprising monitoring one or more properties of the gas flow as an engine condition parameter to obtain a measure of heat soakage effects produced in the compressor by adjustment of relative temperatures between the gas flow and the compressor parts during deceleration of the engine, and the detection of values of said parameter outside a predetermined limit causing said bleed valve to open by opening the bleed valve in response to detected values of said parameter outside a predetermined limit.

2. A method according to claim 1 wherein said measure of heat soakage effects is evaluated from measurements of at least one operational variable related to mass gas flow through the compressor.

3. A method according to claim 2 wherein said measure of the heat soakage effects is evaluated from measurements of the compressor outlet pressure.

4. A method according to claim 1 wherein said gas flow property or properties is monitored at a reiteration rate not substantially less than once per second.

5. A method according to claim 1 wherein said monitoring of engine condition parameters includes monitoring of changes of engine power-setting commands.

6. A method according to claim 5 wherein the changes of power-setting commands are evaluated in dependence upon a comparison of instantaneous power-setting commands with time-lagged power-setting commands.

7. A method according to claim 5 wherein said engine condition parameters monitored during a period of acceleration of the engine further comprise compressor outlet shaft speed and compressor outlet pressure.

8. A pressure bleed control arrangement for the compressor of a gas turbine engine comprising means for monitoring one or more properties of the gas flow as an engine condition parameter to obtain a measure of heat soakage effects produced in the compressor by adjustment of relative temperatures between the gas flow and the compressor parts during deceleration of the engine, and means for actuating the opening of the compressor bleed in response to the sensing of a predetermined limit value of said gas flow property or properties.

9. An arrangement according to claim 8, wherein means are provided for reiterating the evaluation of the values of said gas flow property or properties at intervals not substantially less than 200 ms.

10. An arrangement according to claim 8 further comprising means for monitoring changes of EPR commands as an engine condition parameter and means for actuating the opening of the compressor bleed in response to the sensing of a minimum value of the rate of change of EPR commands.

* * * * *